No. 858,549. PATENTED JULY 2, 1907.
F. L. WEST & C. J. KORTZ.
NUT LOCK.
APPLICATION FILED APR. 10, 1906.

WITNESSES:
E. M. Fisher
R. B. Moser

INVENTORS,
Frank L. West
Conrad J. Kortz
BY H. J. Fisher ATTORNEY.

UNITED STATES PATENT OFFICE.

FRANK L. WEST AND CONRAD J. KORTZ, OF CLEVELAND, OHIO.

NUT-LOCK.

No. 858,549.   Specification of Letters Patent.   Patented July 2, 1907.

Application filed April 10, 1906. Serial No. 311,002.

*To all whom it may concern:*

Be it known that we, FRANK L. WEST and CONRAD J. KORTZ, citizens of the United States, residing at Cleveland, in the county of Cuyahoga and State of Ohio, have invented certain new and useful Improvements in Nut-Locks; and we do declare that the following is a full, clear, and exact description of the invention, which will enable others skilled in the art to which it appertains to make and use the same.

Our invention relates to nut locks, and the object of the invention is to provide a lock for nuts which will prevent the nut from becoming loose by jars or strains to which the bolt may be subjected, but which at the same time will permit the nut to be turned off the bolt by severing the lock bodily through its center, all substantially as hereinafter shown and described and particularly pointed out in the claims.

Figure 1:
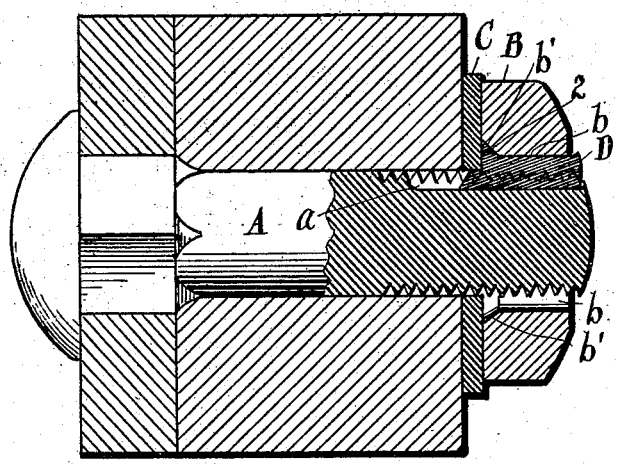
Figure 2:
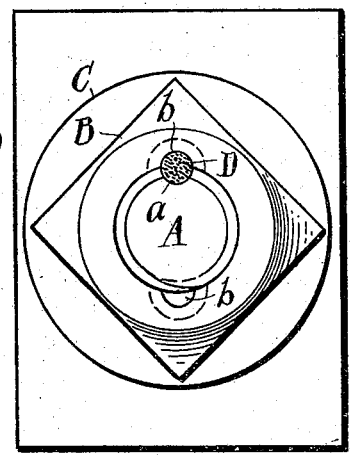
Figure 3:
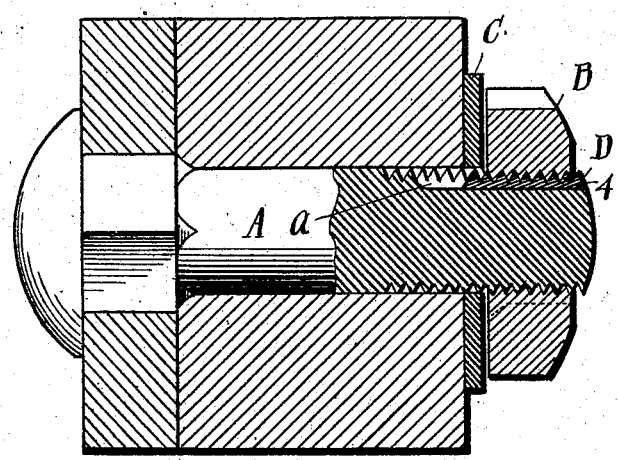
Figure 4:
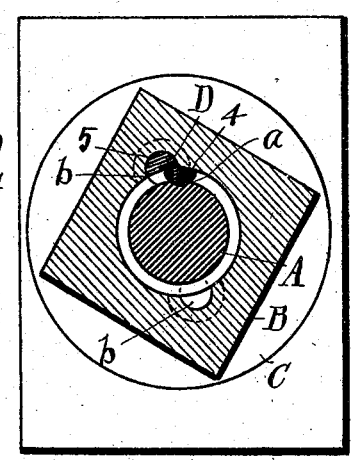
Figure 5:
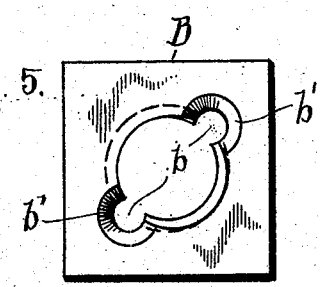
Figure 6:

In the accompanying drawings Figure 1 is a cross section of parts shown as clamped together by means of one of our improved bolts and with the bolt on the section line of the view and partly sectioned as also the nut and lock to disclose the construction of nut, bolt and lock and their relation in locking position, as will hereinafter more fully appear. Fig. 2 is an end elevation of Fig. 1 looking upon the end at the right hand end. Fig. 3 is a sectional elevation corresponding to Fig. 1 except that in this instance the nut is shown as partially turned for release, and Fig. 4 is an end elevation of Fig. 3 showing the position of the nut when cutting of the lock occurs. Fig. 5 shows an elevation of the nut itself, and Fig. 6 is a perspective view of the lock therefor.

A represents an ordinary screw threaded bolt, having its threaded portion in the usual form and otherwise of any usual and common construction, and is shown as provided by a single groove or channel $a$ running lengthwise of the bolt and transversely of the threads thereof and terminating approximately at the ends of said threads. One or more such channels may be used according to the size of the bolt, and said channels are formed to a depth equal substantially to twice the depth of the threads themselves or at what may be defined as semi-circular in cross section, and their size will of course in a measure be determined by the size of the bolt. The relative depth of the said channels in the bolt is clearly shown in Figs. 2 and 4, while nut B has corresponding semi-circular transverse grooves or recesses $b$ in its threaded portion at right angles to the threads, as also clearly disclosed in the drawings. There may be one or more of these grooves or recesses in the nut, and they are preferably thrown into the angles of the nut on account of strength.

C represents a metallic washer used behind the nut and fitting comfortably upon the bolt, so that as the cylindrically shaped lock is driven into locking position it will upset against said washer and be locked from endwise removal, as clearly seen at 2, Fig. 1. To this end the nut has a cavity $b'$ formed at its inner threaded edge in which the stock flows to one side and locks as shown. This, however, does not interfere with the tightness of the connections formed by turning up nut B as far as may be required. The said cylindrical piece D which constitutes our sole lock or key, is preferably formed of solder but any equivalent metal or other material which is adapted to flow as solder will under pressure, or which will serve as a sufficient lock for the nut under any and all circumstances, may be used. But two things are peculiar to this lock and are to be particularly observed to see its advantage and novelty. In the first place the lock is introduced by turning the nut so that one or another of its grooves $b$ will match channel $a$ in the bolt. This being done the piece D can be driven bodily into the complete circular channel thus formed and forced back to upsetting and self locking position. This being done the nut is absolutely locked and one half lies in each member. Now in order that the nut may be released even in the slightest degree it is not enough to only start the thread on the lock by turning the harder thread of the nut thereon, but it will be seen that half the lock is embedded between nut and bolt below the threads on both, and this has got to be bodily sheared off its full length at the same time or the nut cannot turn, and such shearing of the lock must begin the instant the nut begins to turn. Obviously, while turning the hard thread of the nut on the soft metal of the lock in itself might not require, possibly, more effort than conditions might bring to a nut in certain trying positions, it is evident that it is a very different thing to shear or bodily cut such a lock in two its full length at the same time. Obviously this at once places the invention within the grade of nut locks which lock and stay locked until purposely released. Here also we have an important advantage, because while the lock is essentially permanent and unalterable as to all conditions of use, it must respond to the wrench and yields thereto at least with such readiness that it does not become an insuperable obstacle and does not require any other means to secure its release or to break it from its engagements. The effect of the wrench for such release is clearly shown in Figs. 3 and 4, wherein one longitudinal half of the lock, 4, is shown in the nut and sheared but not completely separated in its parts.

The lock or locking piece D is shown as cylindrical and solid with a smooth exterior, but obviously any equivalent cross sectional pattern might be used, in which case the channels $a$ and $b$ would correspond. The tubular or cylindrical form is however preferred.

It will be observed that when the lock or pin D is driven in place the hole therefor is completely filled and exposure to the elements is prevented. Furthermore, this style of lock may be used on turn buckles for bridges, or wagon or carriage axles and in other places and relations so that while the designation of a bolt is employed in the description and a bolt is shown in the drawings the term is to be understood as including such equivalent members and uses as those just enumerated.

What we claim is:—

In nut-locks, a screw threaded member having a channel lengthwise across the threads thereon of greater depth than said threads, in combination with a nut on said member having a plurality of channels across the threads thereof and deeper than said threads, and a cylindrical soft metal shearable pin of uniform thickness filling the channel in said threaded member and one channel in said nut and having its inner end upset to prevent withdrawal.

In testimony whereof we sign this specification in the presence of two witnesses.

FRANK L. WEST.
CONRAD J. KORTZ.

Witnesses:
C. A. SELL,
E. M. FISHER.